US007856515B2

(12) United States Patent
Kim et al.

(10) Patent No.: US 7,856,515 B2
(45) Date of Patent: Dec. 21, 2010

(54) DISPLAY APPARATUS TO DETECT A CONNECTING STATE OF A CABLE

(75) Inventors: Young-chan Kim, Uiwang-si (KR); In-hye Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1212 days.

(21) Appl. No.: 11/426,412

(22) Filed: Jun. 26, 2006

(65) Prior Publication Data

US 2007/0004270 A1 Jan. 4, 2007

(30) Foreign Application Priority Data

Jun. 29, 2005 (KR) ...................... 10-2005-0057151

(51) Int. Cl.
*G06F 3/00* (2006.01)

(52) U.S. Cl. ................................ 710/19; 710/8; 710/17

(58) Field of Classification Search ....................... None
See application file for complete search history.

(56) References Cited

U.S. PATENT DOCUMENTS

| | | | | |
|---|---|---|---|---|
| 5,636,347 | A * | 6/1997 | Muchnick et al. | 710/302 |
| 6,069,619 | A * | 5/2000 | Kim | 345/211 |
| RE38,537 | E | 6/2004 | Kim | |
| 6,810,439 | B2 * | 10/2004 | Benson | 710/16 |
| 2002/0060676 | A1 * | 5/2002 | Kim | 345/212 |
| 2004/0027515 | A1 | 2/2004 | Itakura | |
| 2005/0225547 | A1 * | 10/2005 | Choi | 345/211 |

FOREIGN PATENT DOCUMENTS

| | | |
|---|---|---|
| EP | 0 889 387 B1 | 1/1999 |
| JP | 5-66731 | 9/1993 |
| KR | 1989-3484 | 9/1989 |
| KR | 1999-39150 | 6/1999 |
| KR | 2004-79114 | 9/2004 |

OTHER PUBLICATIONS

Korean Office Action dated Oct. 24, 2006 issued in KR 2005-57151.
European Search Report issued Apr. 15, 2009 in EP Application No. 06116242.6.

* cited by examiner

*Primary Examiner*—Henry W Tsai
*Assistant Examiner*—Kris Rhu
(74) *Attorney, Agent, or Firm*—Stanzione & Kim LLP

(57) ABSTRACT

A display apparatus connected with an external video source through a video cable having a first cable connector and a second connector connected to the external video source includes a display connector having a plurality of signal pins to which the first cable connector is connected, a connecting sensor connected at least two or more of the plurality of signal pins to output a first connecting sense signal to inform a connecting state between the first cable connector and the display connector, and a second connecting sense signal to inform the connecting state between the second cable connector and the external video source, and a controller to output information about the connecting state between the first cable connector and the second cable connector based on the first and the second connecting sense signals from the connecting sensor. Thus, the display apparatus can supply the information about a connecting state of a first cable connector and a second cable connector, respectively, in the display apparatus connected with the external video source by the video cable having the first cable connector and the second cable connector.

35 Claims, 4 Drawing Sheets

FIG. 3

| $P_1$ | $P_2$ | CONNECTING STATE |
|---|---|---|
| L | L | BOTH CONNECTION |
| L | H | COMPUTER → SEPARATION<br>MONITOR → CONNECTION |
| H | H | MONITOR → SEPARATION |

DISPLAY APPARATUS TO DETECT A CONNECTING STATE OF A CABLE

CROSS-REFERENCE TO RELATED APPLICATIONS

This application claims the benefit of Korean Patent Application No. 2005-0057151, filed on Jun. 29, 2005, in the Korean Intellectual Property Office, the disclosure of which is incorporated herein in its entirety by reference.

BACKGROUND OF THE INVENTION

1. Field of the Invention

The present general inventive concept relates to a display apparatus, and more particularly, to a display apparatus connected to an external video source, such as a computer, through a video cable and to supply information about a connecting state of the video cable.

2. Description of the Related Art

Generally, a display apparatus displays an image on a screen based on a video signal supplied from an external video source as being connected with the external video source such as a computer. Here, the display apparatus and the computer are connected through a video cable.

In the display apparatus, a connector of the video cable connecting between the display apparatus and the computer may be not properly connected or may be disconnected from the computer or the display apparatus. In this case, the image is not displayed on the screen of the display apparatus.

However, a user of the display apparatus may misconceive that the display apparatus has a problem when the image is not displayed by a disconnection of the video cable as described above.

U.S. Pat. No. RE 38,537 discloses a controller sensing whether a display apparatus and a computer are normally connected. That is, in a state that the display apparatus and the computer are normally connected, a pin(P1) which is connected to a SYNC GND terminal of a connector and allocated in a microprocessor of the display apparatus, is grounded at a ground of the computer, thereby becoming a 'low' state, and in a case that the connector is released or disconnected, power connected through a pull up resistance (R1) is applied to the pin (P1), thereby becoming a 'high' state. Accordingly, the controller senses that the display apparatus and the computer are normally connected, according to the 'high' state.

Recently, a two-way video connector which comprises a first cable connector for connecting the video cable connecting between the computer and the display apparatus to the computer, and a second cable connector for connecting the video cable to the display apparatus, has been used. However, a connection state of the first cable connector and the second cable connector cannot be detected.

SUMMARY OF THE INVENTION

The present general inventive concept provides a display apparatus capable of supplying information about a connecting state of a first cable connector and a second cable connector of a video cable connecting the display apparatus and an external video source Additional aspects and advantages of the present general inventive concept will be set forth in part in the description which follows and, in part, will be obvious from the description, or may be learned by practice of the general inventive concept.

The foregoing and other aspects of the present general inventive concept may be achieved by providing a display apparatus connected with an external video source through a video cable having a first cable connector and a second connector connected to the external video source, the display apparatus comprising a display connector having a plurality of signal pins to which the first cable connector is connected, a connecting sensor connected at least two or more the plurality of signal pins to output a first connecting sense signal to inform a first connecting state between the first cable connector and the display connector, and a second connecting sense signal to inform a second connecting state between the second cable connector and the external video source, and a controller to output information about a third connecting state between the first cable connector and the second cable connector based on the first and the second connecting sense signals from the connecting sensor.

The signal pins of the display connector may comprise a first signal pin released from a first ground when the first cable connector and the display connector is disconnected, and a second signal pin released from a second ground when the second cable connector and the external video source is disconnected.

The connecting sensor may comprise a first ground detector connected with the first signal pin to output the first connecting sense signal as a first logic value corresponding to whether the first signal pin is grounded, and a second ground detector connected with the second signal pin to output the second connecting sense signal as a second logic value corresponding to whether the second signal pin is grounded.

The signal pins of the display connector may further comprise a third signal pin grounded at a third ground provided in the display apparatus, and the first signal pin is grounded and connected to the third signal pin through the video cable in a state that the first cable connector is connected to the display connector.

The second signal pin may be grounded at the second ground provided in the external video source in a state that the first cable connector and the second cable connector are respectively connected to the display connector and the external video source.

The display apparatus may further comprise signal lines of the video cable which are respectively connected to the first signal pin and the second signal pin and independently grounded each other.

The display apparatus may further comprise a connecting state display part on which information about the connecting state of the first cable connector and the second cable connector is displayed by the controller.

The connecting state display part may comprise a display part on which the information about the connecting state of the first cable connecter and the second cable connecter is displayed as an image.

The first cable connector, the second cable connector, and the display connector have a D-sub connector connecting structure; and the second signal pin of the display connector may be a SYNC ground pin.

The foregoing and other aspects of the present general inventive concept may also be achieved by providing a display apparatus comprising a display connector having a first signal pin to be connected to a first signal line of an external cable to receive a first ground signal, a second signal pin to be connected to a second signal line of the external cable to receive a second ground signal, a third signal pin to be connected to a third signal line of the external cable, and a fourth signal pin to be connected to a fourth signal line of the external cable to receive one of data and a video signal, a first ground connected to the third signal pin so that the first signal pin receives the first ground signal through the first and third signal pins, and a controller having a first terminal connected to the first signal pin to receive the first ground signal and a second terminal connected to the second signal pin to receive the second ground signal to generate a connection state signal according to the first and second ground signal.

The foregoing and other aspects of the present general inventive concept may also be achieved by providing display apparatus comprising a display connector having first, second, third, and fourth signal pins, a first ground connected to the third signal pin, a cable having first and second cable connectors connected through first, second, third, and fourth signal lines, which are respectively connected to the first, second, third, and fourth signal pins of the display connector, the second cable connectors connected to an external apparatus, and a controller having a first terminal connected to the first signal pin and a second terminal connected to the second signal line to generate a connecting state according to signals from the first and second signal pins.

BRIEF DESCRIPTION OF THE DRAWINGS

The above and other features and advantages of the present general inventive concept will become more apparent by describing in detail exemplary embodiments thereof with reference to the attached drawings in which:

FIG. 3 illustrates a connecting state of the connector according to a pin state of a controller of the display apparatus of FIG. 2.

DETAILED DESCRIPTION OF THE PREFERRED EMBODIMENTS

Figure 1:
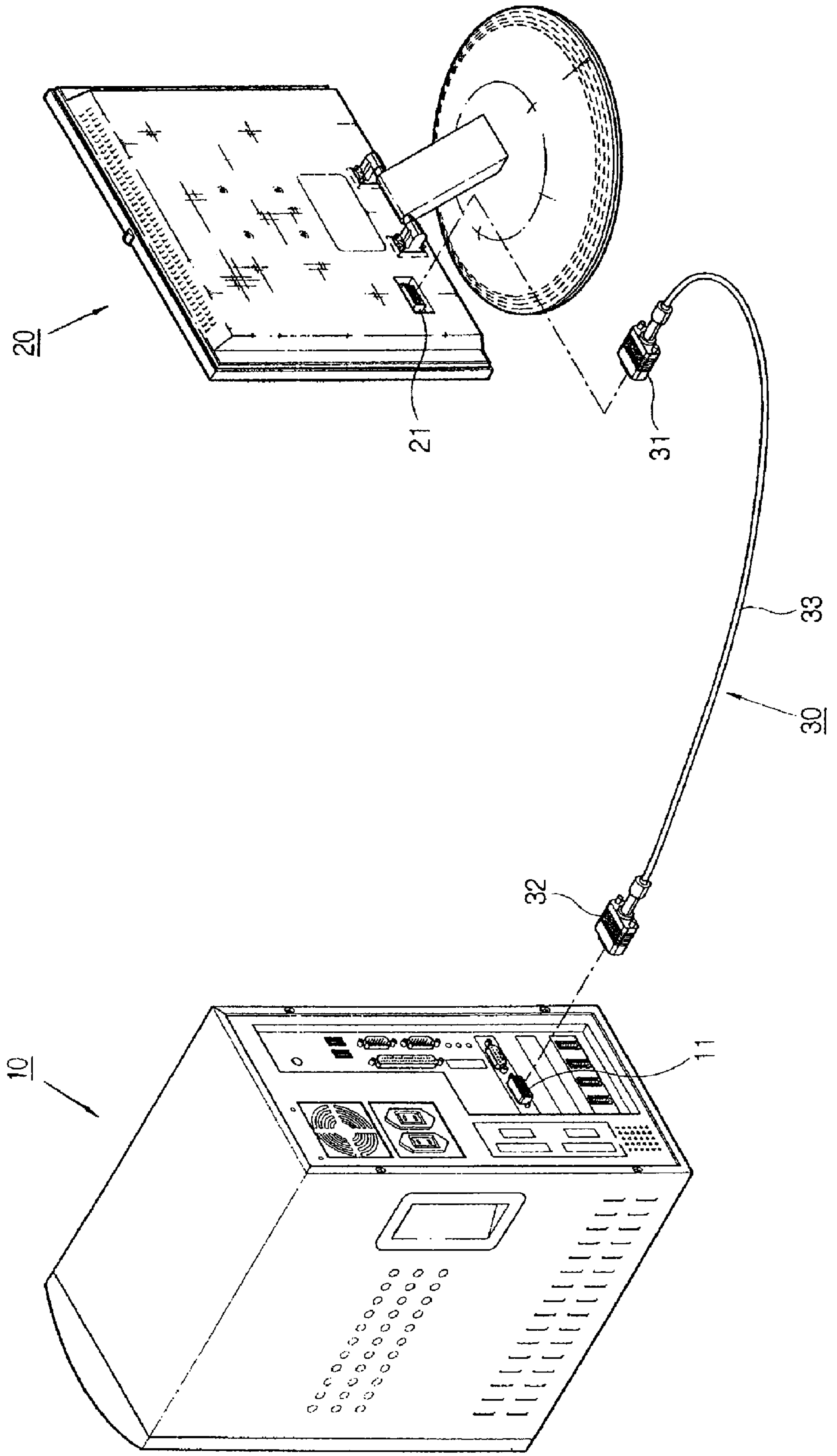
FIG. 1 illustrates connecting relations between a display apparatus and a computer according to an embodiment of the present general inventive concept.

Reference will now be made in detail to the embodiments of the present invention, examples of which are illustrated in the accompanying drawings, wherein like reference numerals refer to like elements throughout. The embodiments are described below so as to explain the present invention by referring to the figures.

Referring to FIG. 1, a display apparatus 20 according to an embodiment of the present general inventive concept is connected with an external video source (i.e., a computer 10) through a video cable 30.

The video cable 30 includes a first cable connector 31 connecting to a display connector 21 provided in the display apparatus 20, a second cable connector 32 connected to a main body connector 11 provided in the computer 10, and a signal line part 33 connecting the first cable connector 31 and the second cable connector 32.

Figure 2:
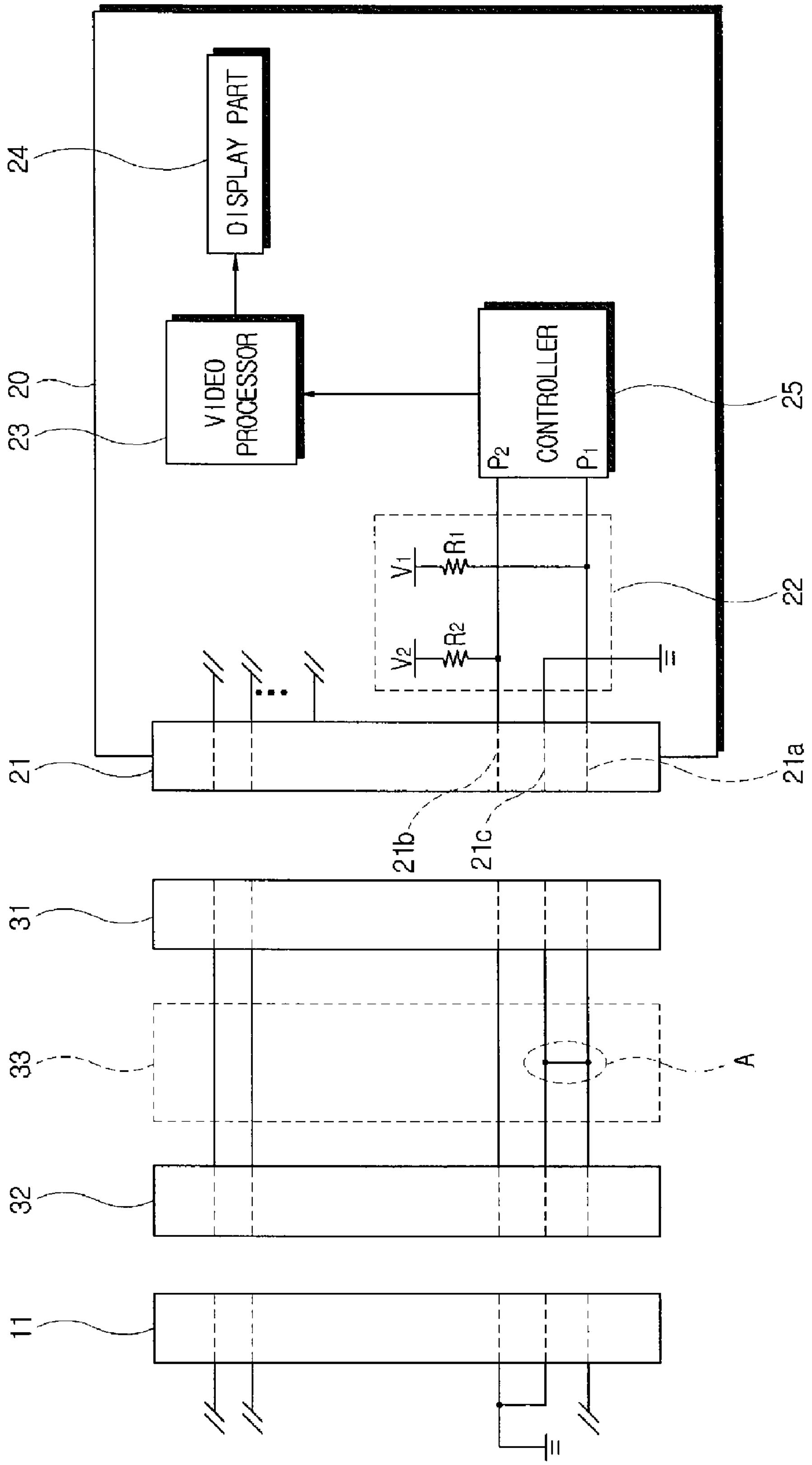
FIG. 2 illustrates a connecting structure of a connector of the display apparatus of FIG. 1.

Referring to FIG. 2, the display apparatus 20 according to the present embodiment includes a display part 24 on which an image is displayed, the display connector 21 to which the first cable connector 31 of the video cable 30 is connected so as to receive the video signal, a video processor 23 to convert the video signal received through the video cable 30 and the display connector 21 into a signal which is formatted so as to allow the display part 24 to display and applying the signal to the display part 24, and a controller 25 to control the display part 24, the display connector 21, and the video processor 23.

A D-Sub connector connecting structure may be used as the main body connector 11, the first cable connector 31, the second cable connector 32 and the display connector 21 according to the present embodiment.

The display connector 21 includes a plurality of signal pins connected with the first cable connector 31. For example, with the connecting structure of the D-Sub connector, the signal pins of the first cable connector 31 may include a signal pin for an R, G, and B video signal, a signal pin for a horizontal and vertical synchronous signal, a ground pin, and extra pins.

The display apparatus 20 according to the present embodiment includes a connecting sensor 22 connected to two or more of the plurality of signal pins of the first cable connector 31 to output a first connecting sense signal to inform a user of a first connecting state between the first cable connector 31 and the display connector 21, and a second connecting sense signal to inform the user of a second connecting state between the second cable connector 32 and the main body connector 11 of the computer 10.

The controller 25 senses a third connecting state of the first cable connector 31 and the second cable connector 32 based on the first and the second connecting sense signals from the connecting sensor 22. The third connection state may include at least one of the first and second connecting states.

Referring to FIG. 2, the signal pins of the display connector 21 include a first signal pin 21 a released (or disconnected) from a first ground when the first cable connector 31 and the display connector 21 are released (or disconnected), and a second signal pin 21*b* released (or disconnected) from a second ground when the second cable connector 32 and the main body connector 11 of the computer 10 are released (or disconnected).

The second signal pin 21*b* is grounded at the second ground provided in the computer 10 in a state that the first cable connector 31 and the second cable connector 32 are respectively connected to the display connector 21 and the main body connector 11 of the computer 10.

The first signal pin 21*a* is grounded at the first ground provided in the display apparatus 20 though a third signal pin 21 c of the display connector 21 in a state that the first cable connector 31 and the display connector 21 are connected. The second signal pin 21*b* is grounded at the second ground provided in the computer 10. Signal lines of the video cable 30 respectively connected to the first signal pin 21*a* and the third signal pin 21*c* may be connected with each other by being grounded at the signal line part 33 of the video cable 30 in common (refer to a portion 'A' of FIG. 2). Although the first signal pin 21*a* and the third signal pin 21*c* are electrically connected through the portion A of the signal lines of the video cable 30, the signal line having the portion A may not be connected to the second ground disposed in the computer 10. According to an embodiment of the present general inventive concept, the signal line having the portion A is connected to the second ground disposed in the computer 10. Accordingly, the first signal pin 21*a* may be grounded and connected with the third signal pin 21*c* through the video cable 30 in the state that the first cable connector 31 and the display connector 21 are connected. The first signal pin 21*a* is released (or disconnected) from the first ground when the first cable connector 31 and the display connector 21 are disconnected.

The signal lines of the video cable 30 respectively connected to the first signal pin 21 a and the second signal pin 21*b* ay be independently grounded, thereby preventing the first signal pin 21 a and the second signal pin 21*b* from being grounded at the same ground in the video cable 30. The video cable 30 further includes other signal lines to transfer data and/or the video signal from the computer 10 to the display apparatus 20.

Meanwhile, the connecting sensor 22 includes a first ground detecting part connected with the first signal pin 21*a* of the display connector 21 to output the first connecting sense signal of the logic value corresponding to the ground of the first signal pin 21*a*, and a second ground detecting part connected with the second signal pin 21*b* to output the second connecting sense signal of the logic value corresponding to the ground of the second signal pin 21*b*.

The first ground detecting part according to the present embodiment may include a first full up resistance R1 branched (connected) from a line which connects between the first signal pin 21*a* and a first terminal P1 of the controller 25, and a first power supplying terminal V1 to supply power through the first full up resistance R1. Therefore, in a state that the first signal pin 21*a* is grounded, the first terminal P1 of the controller 25 becomes a 'low' state (L), and in a state that the first signal pin 21 a is released (or is not grounded), the first terminal P1 is a 'high' state (H) since the power from the first power supplying terminal V1 is applied to the first pin P1 of the controller 25 through the first full up resistance R1.

And also, the second ground detecting part according to the present embodiment may include a second full up resistance R2 branched (connected) from a line which connects between the second signal pin 21*b* and a second terminal P2 of the controller 25, and a second power supplying terminal V2 applying power through the second full up resistance R2. Therefore, in a state that the second signal pin 21*b* is grounded, the second terminal P2 of the controller 25 becomes a low state, and in a state that the ground of the second signal pin 21*b* is released (or the second signal pin 21*b* is not grounded), the second terminal P2 is a high state since the power from the second power supplying terminal V2 is applied to the second terminal P2 of the controller 25 through the second full up resistance R2.

Figure 4A:
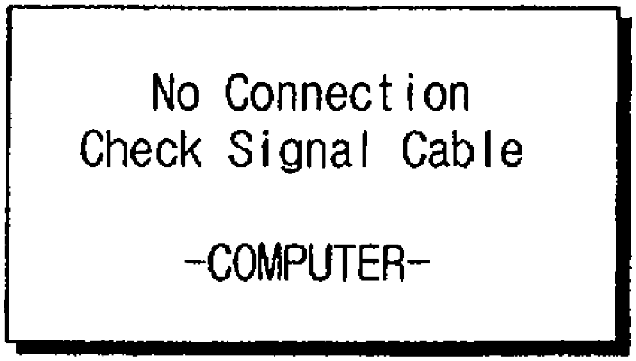
FIGS. 4A and 4B illustrate an error message to be displayed on the display apparatus of FIGS. 1 and 2.
Figure 4B:
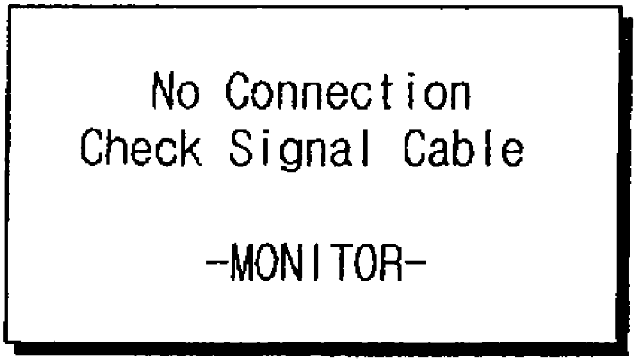

Hereinafter, a method that the controller 25 recognizes a ground state (or a connection state) of the first cable connector 31 and the second cable connector 32 according to the first terminal P1 and the second terminal P2 will be described with reference to FIGS. 3 and 4.

The controller 25 recognizes that the first cable connector 31 and the second cable connector 32 are normally connected to the display connector 21 and the main body connector 11 of the computer 10, respectively, when the controller 25 recognizes that both the first terminal P1 and the second terminal P2 are the 'low' state.

When the first cable connector 31 and the display connector 21 are normally connected, and the second cable connector 32 and the main body connector 11 of the computer 10 is not connected, the controller 25 recognizes that the first terminal P1 is the 'low' state and the second terminal P2 is the 'high' state. At this time, referring to FIG. 4A, the controller 25 controls the video processor 23 to inform a user of a first error message representing that the connection of the second cable connector 32 is released or display the image corresponding to the first error message at the display part 24. The error message displayed at the display part 24 corresponds to an On Screen Display (OSD) image based on video data included in the video processor 23. Although the present embodiment describes that the controller 25 recognizes that the first terminal P1 is the 'low' state and the second terminal P2 is the 'high' state when the second cable connector 32 and the main body connector 11 of the computer 10 is not connected, the present general inventive concept is not limited thereto. That is, it is possible that the controller 25 recognizes that the first terminal P1 is the 'high' state and the second terminal P2 is the 'low' state according to an arrangement of circuit components of the display connector 21, the connecting sensor 22, and the signal part 33.

Further, when the connection of the first cable connector 31 and the display connector 21 is released, the controller 25 recognizes that both the first terminal P1 and the second terminal P2 are the 'high' state. At this time, referring to FIG. 4B, the controller 25 controls the video processor 23 to inform the user of a second error message representing that the connection of the first cable connector 31 is released or display the image corresponding to the second error message at the display part 24. The first or second error message displayed at the display part 24 corresponds to an On Screen Display (OSD) based on the video data comprised in the video processor 23.

The foregoing embodiment illustrates that the controller 25 displays the image corresponding to the received video signal and/or representing the information about the connection state of the first cable connector 31 and the second cable connector 32 through the display part 24. Alternatively, the display apparatus 20 according to the present embodiment may comprise a respective connecting state display part on which the information about the connection state of the first cable connector 31 and/or the second cable connector 32 is displayed by controlling of the controller 25. For example, the connecting state display part may be an LED which is on and off according to the connection state of the first cable connector 31 and/or the second cable connector 32.

It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

What is claimed is:

1. A display apparatus connected with an external video source through a video cable having a first cable connector and a second connector connected to the external video source, comprising: a display connector having a plurality of signal pins to which the first cable connector is connected;

a connecting sensor connecting at least two or more of the plurality of signal pins to output a first connecting sense signal representing a connecting state between the first cable connector and the display connector, and a second connecting sense signal representing a second connecting state between the second cable connector and the external video source when the first cable connector and the display connector are connected;

and a controller to output information about the connecting state of the first cable connector and the second cable connector based on the first and the second connecting sense signals from the connecting sensor.

2. The display apparatus according to claim 1, wherein the signal pins of the display connector comprises:

a first signal pin disconnected from a first ground when the first cable connector and the display connector are disconnected; and a second signal pin disconnected from a second ground when the second cable connector and the external video source are disconnected.

3. The display apparatus according to claim 2, wherein the connecting sensor comprises:

a first ground detector connected with the first signal pin to output the first connecting sense signal as a first logic value corresponding to whether the first signal pin is grounded; and a second ground detector connected with the second signal pin to output the second connecting sense signal as a second logic value corresponding to whether the second signal pin is grounded.

4. The display apparatus according to claim 3, wherein the signal pins of the display connector further comprises a third signal pin grounded at the first ground provided in the display apparatus, and the first signal pin is grounded and connected to the third signal pin through the video cable in a state that the first cable connector is connected to the display connector.

5. The display apparatus according to claim 4, the video cable comprises signal lines which are respectively connected to the first signal pin and the second signal pin and are each independently grounded.

6. The display apparatus according to claim 3, wherein the second signal pin is grounded at the second ground provided in the external video source in a state that the first cable connector and the second cable connector are respectively connected to the display connector and the external video source.

7. The display apparatus according to claim 6, the video cable comprises signal lines which are respectively connected to the first signal pin and the second signal pin and are each independently grounded.

8. The display apparatus according to claim 2, wherein the first cable connector, the second cable connector, and the display connector have a D-sub connector connecting structure, and the second signal pin of the display connector is a SYNC ground pin.

9. The display apparatus according to claim 1, further comprising:

a connecting state display part to display the information about the connecting state of the first cable connector and the second cable connector.

10. The display apparatus according to claim 9, wherein the connecting state display part comprises a display part on which the information about the connecting state of the first cable connecter and the second cable connecter is displayed as a video.

11. A display apparatus comprising:

a display connector having a first signal pin to be connected to a first signal line of an external cable to receive a first ground signal, a second signal pin to be connected to a second signal line of the external cable to receive a second ground signal, a third signal pin to be connected to a third signal line of the external cable, and a fourth signal pin to be connected to a fourth signal line of the external cable to receive one of data and a video signal;

a first ground connected to the third signal pin so that the first signal pin receives the first ground signal through the first and third signal pins; and a controller having a first terminal connected to the first signal pin to receive the first ground signal, having a second terminal connected to the second signal pin to receive the second ground signal, generating a first connection state signal of the external cable according to the first ground signal, and generating a second connection state signal of the external cable according to the second ground signal, wherein the first connection state signal represents a connection state between the display connector and the external cable, and the second connection state signal represents a connection state between the external cable and an external device when the display connector and the external cable are connected.

12. The display apparatus according to claim 11, further comprising:

a first potential source connected to a junction between the first signal pin of the display connector and the first terminal of the controller; and a second potential source connected to a second junction between the second signal pin of the display connector and the second terminal of the controller.

13. The display apparatus according to claim 12, wherein the controller generates the connecting state according to the first ground signal of the first signal pin and a first potential of the first potential source.

14. The display apparatus according to claim 12, wherein the controller generates the connecting state according to the second ground signal of the second signal pin and a second potential of the second potential source.

15. The display apparatus according to claim 12, wherein the controller generates the connecting state according to the first ground signal of the first signal pin, a first potential of the first potential source, the second ground signal of the second signal pin, and a second potential of the second potential source.

16. The display apparatus according to claim 11, further comprising:

a video processor having terminals connected to the controller and the fourth signal pin to generate a first image signal according to the connection state signal and a second image signal according to the one of the data and the video signal.

17. A display apparatus comprising:

a display connector having first, second, third, and fourth signal pins;

a first ground connected to the third signal pin;

a cable having first and second cable connectors connected through first, second, third, and fourth signal lines, which are respectively connected to the first, second, third, and fourth signal pins of the display connector, the second cable connectors connected to an external apparatus; and a controller having a first terminal connected to the first signal pin to generate a first connecting state of the cable according to the signal from the first signal pin and a second terminal connected to the second signal line to generate a second connecting state of the cable according to a signal from the second signal pin, wherein the first connection state represents a connection state between the display connector and the first cable connector, and the second connection state represents a connection state between the second cable connector and the external apparatus when the display connector and the first cable connector are connected.

18. A display apparatus comprising:

one or more pins connectable to one or more cable ports of a cable; and a controller to generate, according to a voltage state applied to the one or more pins, a first control signal representing a first connection state between the one or more pins and the one or more cable ports of the cable, and a second control signal representing a second connection state between the cable and an external device which is connectable to the cable, when the one or more pins are connected to the one or more cable ports of the cable.

19. The display apparatus according to claim 18, further comprising:

an OSD generator to generate an OSD representing at least one of the first connection state and the second connection state according to the control signal.

20. The display apparatus according to claim 19, wherein:

the control signal comprises a first control signal representing the first connection state between the one or more pins and the one or more cable port of the cable and a second control signal representing the second connection state between the cable and an external device which is connectable to the cable according to the voltage state of the one or more pins; and the OSD comprises a first OSD representing the first connection state and a second OSD representing the second connection state.

21. The display apparatus according to claim 18, wherein the external device comprises one of a computer, a set top box, a DVD player, a servo system, a network, and a recording medium player to output video and/or audio signals through the cable.

22. The display apparatus according to claim 18, further comprising:

a voltage source connected between the controller and the one or more pins, wherein the connected pins have a first voltage state or a second voltage state, and the controller generates the control signal according to the first voltage state and the second voltage state.

23. The display apparatus according to claim 22, wherein the first voltage state and the second voltage state are selectively applied to the controller according to the first and second connection states.

24. The display apparatus according to claim 22, wherein the one or more pins comprises a first pin and a second pin to receive the voltage state, and the controller comprises a first terminal and a second terminal connected to the voltage source and corresponding ones of the first and second pins to receive one of the first voltage state and the second voltage state according to the first and second connection states.

25. The display apparatus according to claim 24, wherein the controller comprises a first terminal and a second terminal connected to the voltage source and the first and second pins, respectively, and detects one of the first voltage state and the second voltage states applied to the respective first and second terminals.

26. The display apparatus according to claim 22, wherein the controller determines the first and second connection states according to a combination of the detected first voltage state and second voltage states received through the respective first and second terminals.

27. The display apparatus according to claim 18, further comprising:

a voltage source connected between the controller and the one or more pins to supply a second voltage state, wherein:

the controller comprises first and second terminals connected to the voltage source and corresponding ones of the one or more pins, the controller generates determines the first connection state according to a first combination of the voltage state of the first terminal and the second voltage state of the second terminal and the second connection state according to a second combination of the second voltage state of the first terminal and the voltage state of the second terminal.

28. The display apparatus according to claim 27, wherein:

the first connection state represents a connection failure between the one or more pins and the one or more cable port of the cable according to the first combination, and the second connection state represents a connection failure between the cable and the external device according to the second combination.

29. The display apparatus according to claim 18, wherein the one or more pins comprises a first pin and a second pin to receive the voltage state, and the controller determines the first and second connection states according to the voltage state of the first and second pins.

30. The display apparatus according to claim 29, wherein the controller determines the first connection state when the first pin receives the voltage state, and determines the second connection state when the second pin receives the voltage.

31. The display apparatus according to claim 30, wherein the controller detects the voltage state applied to each of the first and second pins and determines the first and second connection states according to a combination of the detected voltage states applied to the first and second pins.

32. The display apparatus according to claim 18, wherein:

the first connection state represents that the one or more pins and the one or more cable port of the cable are not connected; and the second connection state represents that the one or more pins and the one or more cable port of the cable are connected, and that the cable and the external device are not connected.

33. The display apparatus according to claim 18, wherein the cable comprises first, second, and third lines connected to the external device;

the one or more ports comprises first, second, and third ports formed on the first, second, and third lines, respectively;

the one or more pins comprises first, second, and third pins connectable to the first, second, and third ports, respectively;

two of the first, second, and third lines of the cable are connected to each other; and the third pin is grounded so that the controller receives the voltage state through the first and second pins.

34. The display apparatus according to claim 18, wherein:

the voltage state comprises a first voltage state and a second voltage state; and the controller generates the control signal according to the first and the second voltage state.

35. The display apparatus according to claim 34, wherein:

the first voltage state and a second voltage state are selectively applied to the controller according to the first and the second connection state.

* * * * *